United States Patent [19]

Schuit

[11] Patent Number: 4,915,409
[45] Date of Patent: Apr. 10, 1990

[54] MULTI-PIVOT VEHICLE SUSPENSION

[76] Inventor: Johannes Schuit, 1433 Camilo Trillado, Carpinteria, Calif. 93013

[21] Appl. No.: 282,739

[22] Filed: Dec. 12, 1988

Related U.S. Application Data

[63] Continuation-in-part of Ser. No. 34,611, Apr. 6, 1987, abandoned.

[51] Int. Cl.4 .............................................. B60F 11/18
[52] U.S. Cl. .................................... 280/721; 280/690; 280/688
[58] Field of Search ............... 280/664, 684, 700, 6.1, 280/695, 804, 721, 689, 688, 690, 722

[56] References Cited

U.S. PATENT DOCUMENTS

| | | | |
|---|---|---|---|
| 2,622,896 | 12/1952 | Wilkinson | 280/721 |
| 2,906,543 | 9/1959 | Polhemus | 280/721 |
| 4,614,358 | 9/1986 | Wymann | 280/721 |
| 4,635,958 | 1/1987 | Yonemoto | 280/721 |

Primary Examiner—Richard A. Bertsch
Attorney, Agent, or Firm—William W. Haefliger

[57] ABSTRACT

A vehicle suspension includes: a main frame extending forwardly, front and rear pairs of wheels, and transverse axles for the wheels of said pairs, two transversely spaced and forwardly and rearwardly elongated members pivotally carried by the frame to pivot about length axes defined by the members, each member having front and rear turned end portions, four supports transmitting loading to the axles near the wheels, the supports terminally supporting the turned end portions, respectively, and the supports located in offset relation to the member length axes for transverse movement relative to the axles during pivoting of the members.

13 Claims, 5 Drawing Sheets

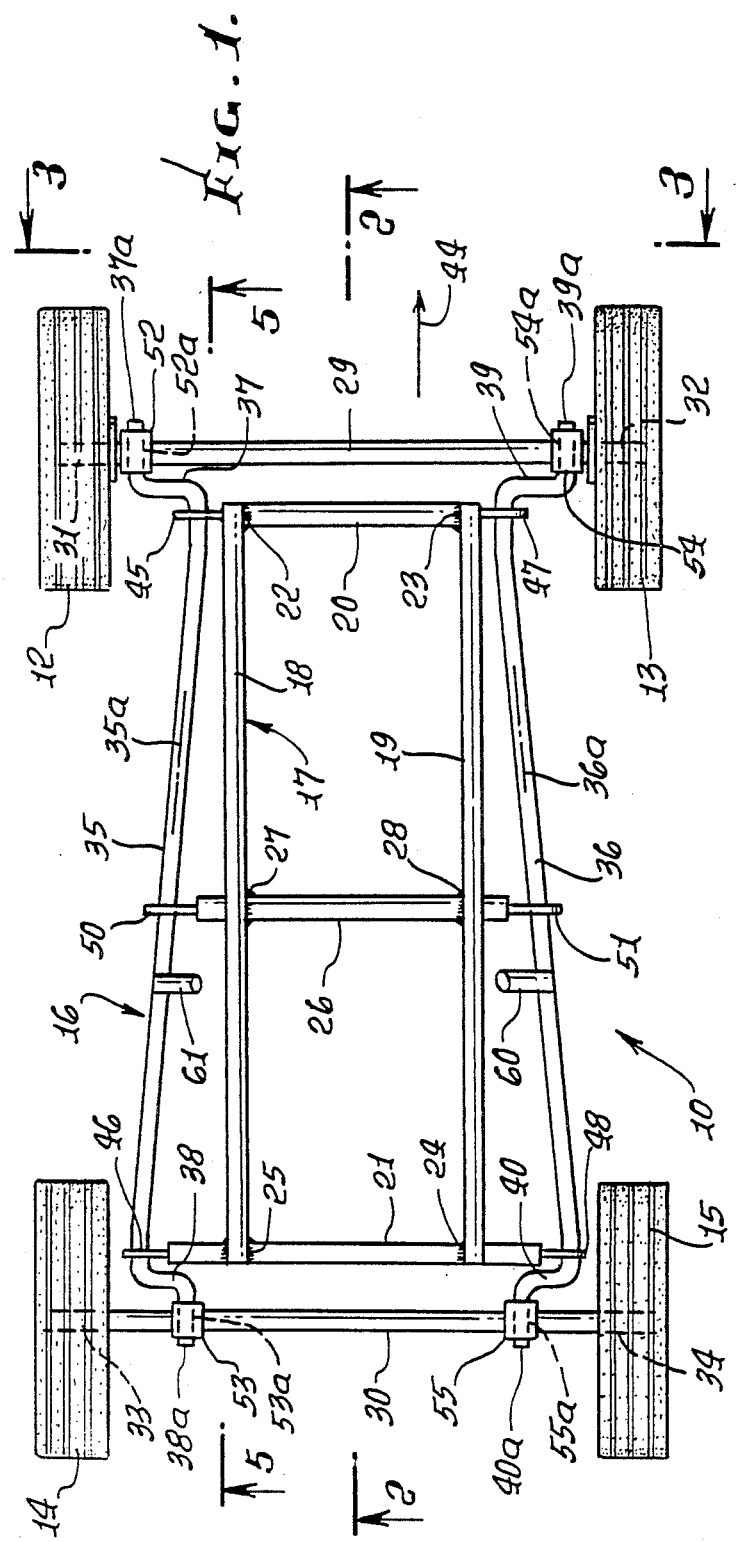

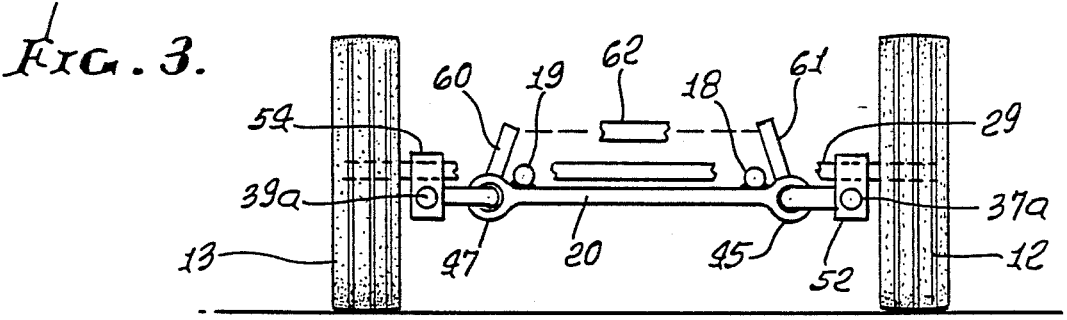
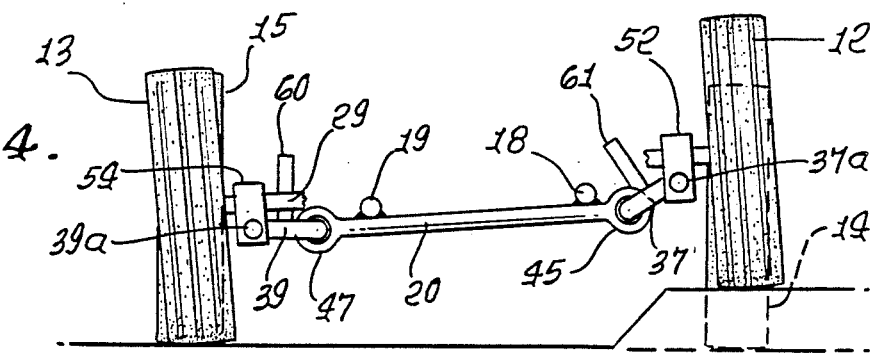
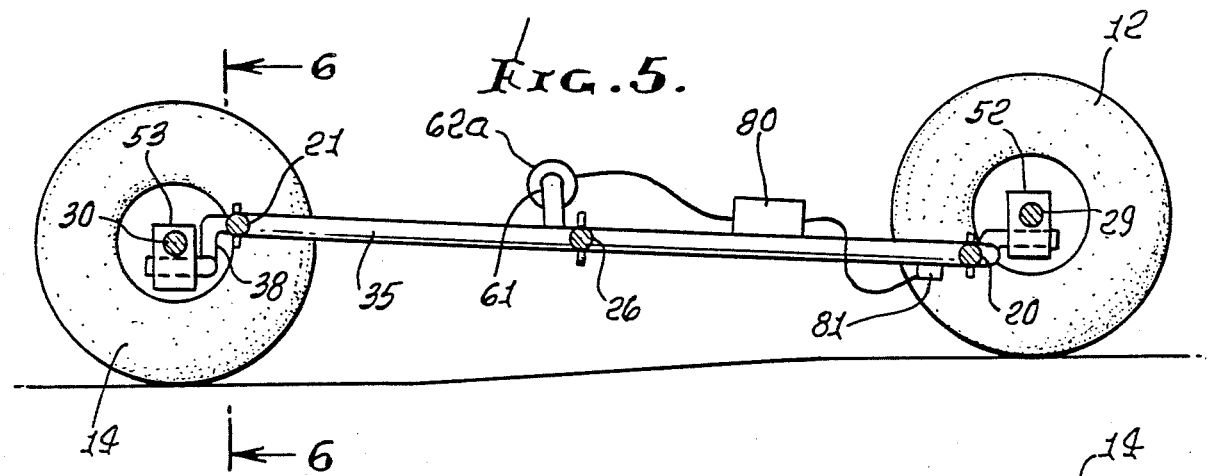
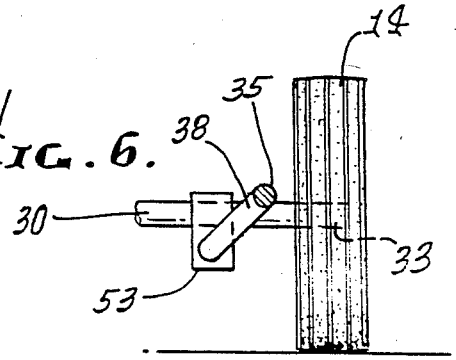

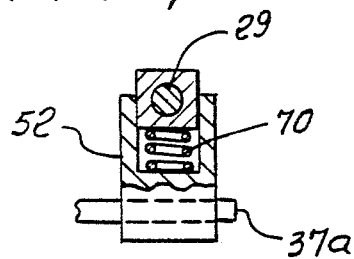
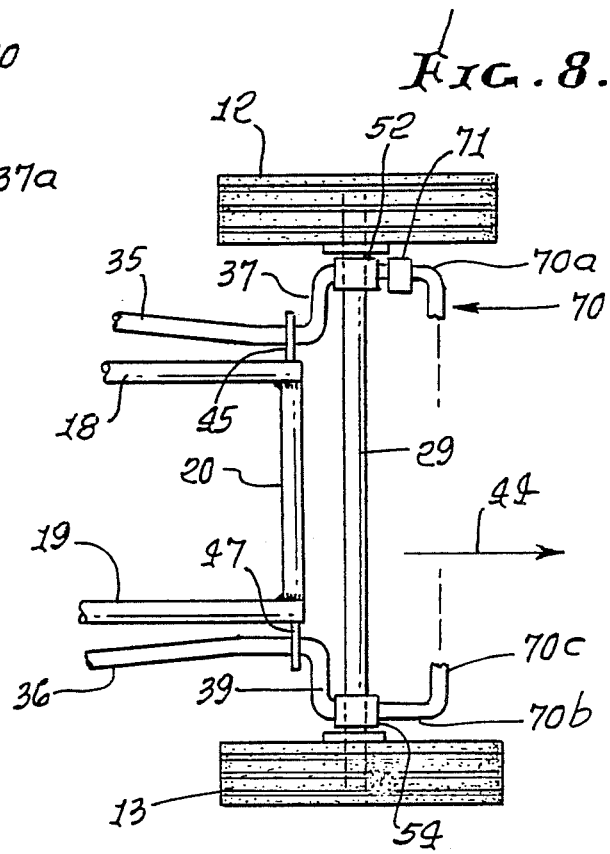
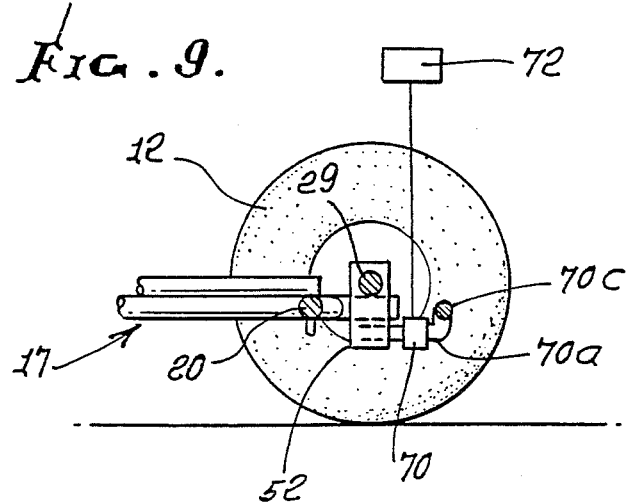

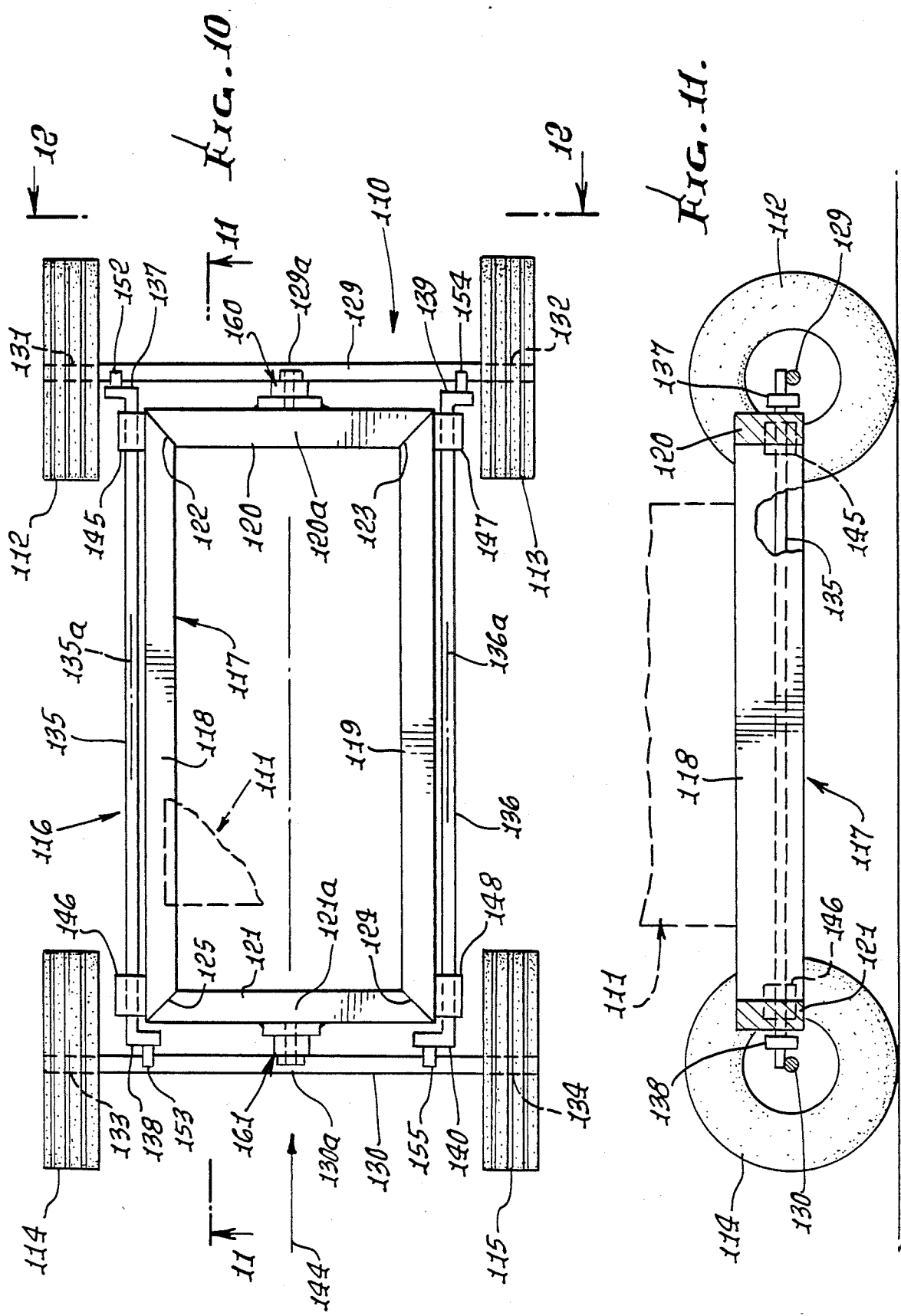

MULTI-PIVOT VEHICLE SUSPENSION

BACKGROUND OF THE INVENTION

This application is a continuation-in-part of Ser. No. 034,611 filed Apr. 6, 1987, now U.S. Pat. No. 4,793,630 issued Dec. 27, 1988.

This invention relates to vehicle suspension, and more particularly to an improved, simple and rugged suspension allowing independent upward pivoting of vehicle wheels, and also compensating movement of suspension structure for wheels not so pivoted.

There is a continuing need for simple, rugged, and reliable vehicle suspensions; also, there is need for suspensions that allow independent pivoting of vehicle wheels as well as compensating movement of suspension elements associated with non-pivoting wheels. Examples are found in agricultural vehicles which sway on rough terrain. Such sway is enhanced by suspensions employing springs, and leads to danger o overturning.

SUMMARY OF THE INVENTION

It is a major object of the invention to provide an improved suspension meeting the above needs. Basically, it comprises:

(a) a main frame extending forwardly, (b) front and rear pairs of wheels, and transverse axles for the wheels of said pairs, (c) two transversely spaced and forwardly and rearwardly elongated members pivotally carried by the frame to pivot about length axes defined by the members, each member having front and rear turned end portions, (d) four supports transmitting loading to the axles near the wheels, the supports terminally supporting said turned end portions, respectively, and the supports located in offset relation to said member length axes for transverse movement relative to said axles during pivoting of said members.

As will be seen, pivot means may be provided to pivotally connect the axle to the frame to allow pivoting of the axles relative to the frame about an axis or axes extending forwardly relative to the frame and located intermediate opposite sides of the frame. Such pivot means typically include forward and rearward pivots proximate forward and rearward axles, respectively.

It is another object to provide the front and rear turned end portions associated with each of the members to extend laterally, in generally opposite directions, the supports downwardly engaging the axles in load transfer relation, to slide relatively transversely thereon in response to pivoting of said supports with said members. Also, each of the members is typically continuous between the turned end portions of the member.

Another object is to provide for frame interconnections of the forwardly elongated members, one at or proximate each side of the frame, so as to allow pivoting of said members in the same sense, about their length axes, in response to elevation of any wheel relative to other wheels. In this regard, bearing means is typically attached to side portions of the frame to pivotally carry each of said members at forward and rearward locations, relative to the frame.

These and other objects and advantages of the invention, as well as the details of an illustrative embodiment will be more fully understood from the following specification and drawings, in which:

DRAWING DESCRIPTION

FIG. 1 is a top plan view of a vehicle suspension system incorporating the invention;

FIG. 2 is a side elevation taken on lines 2—2 of FIG. 1;

FIG. 3 is an end elevation taken on lines 3—3 of FIG. 1;

FIG. 4 is a view like FIG. 3 showing suspension elements shifted in positions due to elevation of one wheel;

FIG. 5 is a view like FIG. 2, but showing suspension elements shifted in positions due to elevation of certain wheels;

FIG. 6 is a section on lines 6—6 of FIG. 5;

FIG. 7 is a fragmentary view showing a modification providing spring support for an axle;

FIGS. 8 and 9 are modified fragmentary views like FIGS. 1 and 2;

FIG. 10 is a top plan view of a modified vehicle suspension system incorporating the invention;

FIG. 11 is a side elevation taken in section on lines 11—11 of FIG. 10;

DETAILED DESCRIPTION

Figure 12:
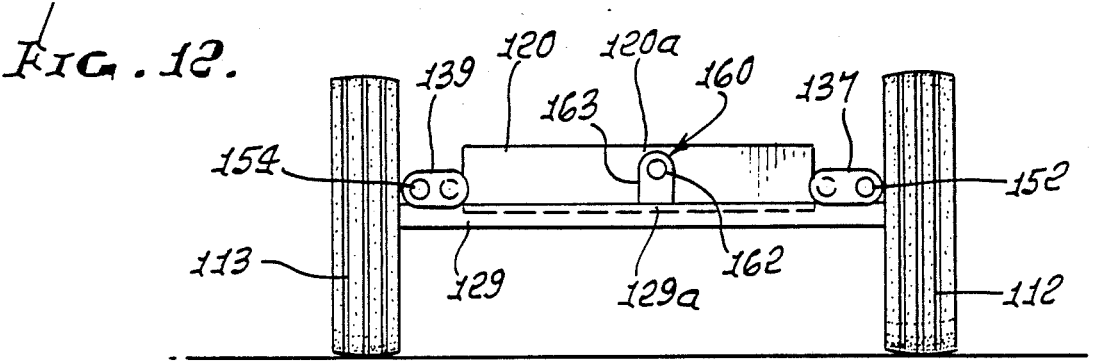
FIG. 12 is an end elevation taken on lines 12—12 of FIG. 10.

In FIGS. 1-3, a vehicle 10 includes a body 11, four wheels 12-15, and a suspension system 16 suspended by the wheels and carrying the body. The suspension system includes a main frame 17 having longitudinally elongated, parallel members 18 and 19 which are laterally spaced apart, and laterally elongated parallel members 20 and 21 which are longitudinally spaced apart. These members are connected, as by welding, for example, at corner location 22-25. A laterally elongated crosspiece 26 is located intermediate the members 20 and 21, and is connected to members 18 and 19 as at weld locations 27 and 28. A rigid frame assembly is thus provided.

The front wheels 12 and 13 are interconnected by an axle 129, and the rear pair of wheels 114 and 115 are interconnected by an axle 30. Suitable bearings journal the wheels on the axles, as at locations 31-34.

In accordance with the invention, two forwardly and rearwardly elongated members are pivotally carried by the frame to pivot about length axes defined by the members, each member having front and rear turned end portions. See for example the elongated members 35 and 36 defining axes 35a and 36a about which they are pivotable. Member 35 has front and rear turned end portions or legs 37 and 38, leg 37 turned outwardly toward wheel 12, and leg 38 turned inwardly away from wheel 14. Member 36 has front and rear turned end portions or legs 39 and 40, leg 39 turned outwardly toward wheel 13, and leg 40 turned inwardly away from wheel 15. Thus, legs 37 and 39 extend laterally in generally opposite directions, depending upon the extent of their relative pivoting; and legs 38 and 40 extend laterally and in generally opposite directions depending upon the extent of their relative pivoting. Note also that the members 35 and 36 mutually taper in the longitudinal direction of arrow 44.

The elongated members 35 and 36 are pivotally carried by the frame to allow them to pivot about axes 35a and 36a, relative to the frame, and independently of one another. See for example the fore and aft journals at 45 and 46 for member 35, and the fore and aft journals 47 and 48 for member 36. The journals are carried by the lateral members 20 and 21, as shown. See also additional journals 50 and 51 for the respective members 35 and 36, carried by crosspiece 26, at its opposite ends.

Further, four supports 52-55 are carried on the axles, as shown, and they terminally support the turned end portions or legs, as per the following:

TABLE

| Support: | Supports Terminal: | Of Leg: |
|---|---|---|
| 52 | 37a | 37 |
| 53 | 38a | 38 |
| 54 | 39a | 39 |
| 55 | 40a | 40 |

The terminals 37a-40a extend forwardly and rearwardly, parallel to arrow 44, and they define associated axes that extend forwardly and rearwardly and about which the terminals are pivotable in journals 52a-55a defined by the supports 52-55, respectively, in response to pivoting of the members 35 and 36 about their axes 35a and 36a. Thus, as wheel 12 elevates relative to the other wheels, axle 29 tilts as seen in FIG. 4. Leg terminal 37a is elevated and rotates counterclockwise in journal 52a so that the forward end of member 35 is lowered relative to axle 29, and the forward part of the frame, as represented by crosspiece 20, is not tilted up to the angular degree that axle 29 is (although the entirety of crosspiece 20 is elevated), while the rear part of the frame, as represented by crosspiece 21 undergoes tilting to the same degree as crosspiece 20; but one end of crosspiece 21 is elevated relative to axle 30, whereas the opposite end of crosspiece 21 is depressed relative to axle 30. Thus, the net effect is that each wheel may become elevated relative to other wheel, as by road obstructions, with minimum disturbance to the frame and body, and no springs or spring associated mechanism complexity is required.

Also provided is means interconnecting the two elongated members 35 and 36, to transmit torque therebetween; and typically, such means may interconnect the members 35 and 36 to allow their pivoting in the same sense, about their length axes, in response to elevation of any wheel relative to other wheels. For example, note the two stub shafts or projections 60 and 61 respectively connected to the members 35 and 36, and projecting upwardly, as in FIG. 3.

When wheel 12 is elevated, as in FIG. 4, both members 35 and 36 are rotated counterclockwise as viewed in FIG. 4, as are the projections 60 and 61. A link 62 may be pivotally and suitably connected between the projections, as shown, offset from the plane defined by members 35 and 36. The link 62 may be replaced by an actuator (represented by 62), operable to effect controlled relative pivoting of the members 35 and 36; thus as the actuator is expanded lengthwise, projection 60 rotates clockwise and projection 61 rotates counterclockwise. The result is that the frame forward crosspiece 20 elevates and the rearward crosspiece 21 is lowered, the fulcrum for such pivoting provided by the journals 50 and 51. The opposite effect is also true, as shown in FIG. 5, with the front crosspiece 20 lowered relative to axle 29, and the rear crosspiece 21 of the frame elevated relative to rear wheel axle 30. This then allows the revision of actuator means to controllably tilt the vehicle frame about a lateral axis between the front and rear of the frame; and the element 62 is representative of such an actuator. See also the actuator 62a in FIG. 5.

If the vehicle frame is additionally supported by springs, so that the front of the vehicle tends to drop in response to braking (an effect also produced by downward compression of pneumatic tires at the front wheels), such tilting of the frame and body can then be compensated for by the actuator 62a which correspondingly rotates members 35 and 36 to raise the frame front end a compensating amount. See for example the spring support at 70 of a wheel axle 29 by the support 52.

A proximity sensor 80 may then be carried by the tiltable frame to sense the proximity of ground level to the frame or vice versa. The sensor is connected to the feedback circuitry 81 controlling the actuator 62a, so as to maintain the frame at the sensor location at fixed distance from the ground (by controlled tilting of the frame as the springs compress and expand during braking, deceleration, etc.).

FIGS. 8 and 9 are modified fragmentary views like FIGS. 1 and 2, showing provision of an "anti-sway" bar 70 extending between and connected to supports 52 and 54. The bar is generally U-shaped, having turned ends 70a and 70b attached to the supports 52 and 54. The bar also has a transversely elongated "torsion" section 70c integral with and extending between ends 70a and 70b. A clutch 71 is connected between portions of turned end 70a, and when the clutch is energized, the end 70a is made integral to act like integral end 70b, at which time the anti-sway bar yieldably resists raising or lowering of one wheel relative to the others (see wheels 12 and 13); i.e. torsion section 70c torsionally resists such lowering or raising. The extent of the axle 29 between supports 52 and 54 may be eliminated under such circumstances.

When clutch 71 is de-energized, the effect of the bar 70 is eliminated. The clutch can be of various types, such as electrical (see control 72, therefor, operable from the interior of the vehicle), or hydraulic, or mechanical.

Such a "sway bar" may also or alternatively be connected between the supports for the rear pair of wheels.

In FIGS. 10-14, a modified vehicle 110 includes a body 111, four wheels 112-115, and a suspension system 116 suspended by the wheels and carrying the body. System 116 includes a main frame 117 having longitudinally elongated, parallel members 118 and 119 which are laterally spaced apart, and laterally elongated parallel members 120 and 121 which are longitudinally spaced apart. These members are connected, as by welding of the members, for example at corner locations 122-125. A rigid frame is thus provided.

The front wheels 112 and 113 are interconnected by an axle 129, and the rear pair of wheels 114 and 115 is interconnected by an axle 130. Suitable bearings journal the wheels on the axles, as at locations 131-134. Axles 129 and 130 extend transversely, as shown.

In accordance with the invention, two transversely spaced and forwardly and rearwardly elongated members are pivotally carried by the frame to pivot about length axes defined by the members each member having front and rear turned end portions. See for example the elongated members 135 and 136 defining axes 135a and 136a about which they are pivotable. Member 35 has front and rear turned end portions or legs 137 and 138, leg 137 turned outwardly forward wheel 112, and leg 138 turned inwardly away from wheel 114. Member 136 has front and rear turned end portions or legs 139 and 140, leg 139 turned outwardly toward wheel 113, and leg 140 turned inwardly away from wheel 115. Thus, legs 137 and 139 extend laterally in generally opposite directions, depending upon the extent of their relative pivoting; and legs 138 and 140 extend laterally and in generally opposite directions depending upon the extent of their relative pivoting. Members 135 and 136 may extend in parallel or closely parallel relation. Member 135 is continuous between portions 137 and 138; and member 136 is continuous between portions 139 and 140.

Member 135 is carried by fore and aft journals 145 and 146 attached to frame member 118, to pivot about axis 135a; and member 136 is carried by fore and aft journals 147 and 148 attached to frame member 119 to pivot about axis 136a.

Further, four supports 152–155 transmit loading from members 135 and 136 to the axles, near the wheels, the supports terminally supporting the turned end portions or legs 152–155 (and may be integral therewith), as per the following:

TABLE

| Support | Supports Leg |
|---------|--------------|
| 152 | 137 |
| 153 | 138 |
| 154 | 139 |
| 155 | 140 |

Figure 13:
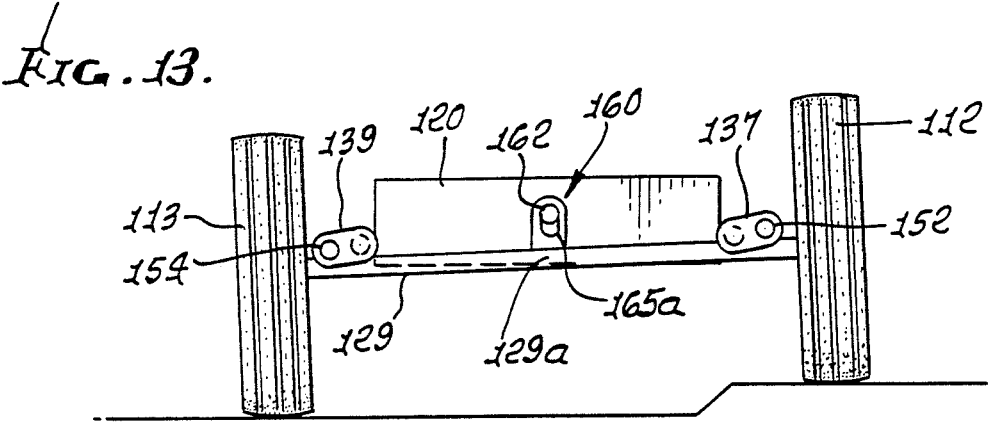
FIG. 13 is an end view like FIG. 12 showing suspension elements shifted in positions due to elevation of one wheel.
Figure 14:
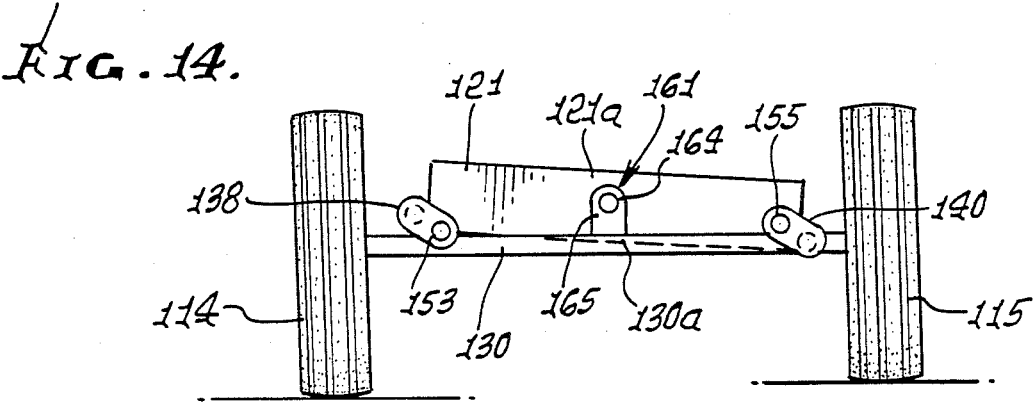
FIG. 14 is a view like FIG. 13 but taken from the opposite end of the vehicle, and looking reversely as compared with FIG. 13.

The supports 152–155 extend forwardly and rearwardly, parallel to arrow 144, and they are located in offset relation to the member length axes for transverse movement relative to and lengthwise along the axles during pivoting of the members 135 and 136. Thus, if wheel 112 rises relative to wheel 113 due to riding up on pavement portion 200a, above horizontal pavement portion 200 supporting wheel 113, axle 129 will tilt, as seen in FIG. 13, relative to the frame 120, member 136 will elevate relative to the axle, member 136 and leg 139 will rotate counterclockwise in FIG. 13 as support 154 is simultaneously rotated and shifted transversely rightwardly on top of the axle to which it transfers loading. In the same manner, axle 129 will lift support 152, pivoting leg 137 and member 135 counterclockwise as support 152 slides transversely leftwardly on top of the axle to which it transfers loading. Frame member 120, although tilted counterclockwise, is not tilted as much as axle 129, due to its unique manner of support by members 135 and 136, legs 137–140 and supports 152–155. The latter may be cylindrical as shown, and project forwardly and rearwardly, on top of the axles, relative to which they shift. Thus, an entirely springless system is provided which compensates for uneven road surfaces, and minimizes tilt of the frame and side-sway of the body 11 thereon. FIG. 14, looking in the opposite direction to FIG. 13, shows axle 130 not tilted, but frame member 121 tilted like member 120. Legs 138 and 140 are tilted as shown, due to tilting of legs 137 and 139, as described.

Also provided is pivot means pivotally connecting the axles to the frame to allow pivoting of the axles relative to the frame, about an axis or axes extending forwardly relative to the frame and located intermediate opposite sides of the frame. See for example pivot means 160 connected between mid-extent 129a of axle 129 and mid-extent 120a of frame member 120; and pivot means 161 connected between mid-extent 130a of axle 130, and mid-extent 121a of frame member 121. As seen in FIG. 12, for example, the pivot means 160 may include a forwardly extending shaft 162 integral with frame member 120, and projecting in journal 163 attached to axle 129. Similarly, in FIG. 14, the pivot means 161 may include a rearwardly extending shaft 164 projecting in journal 165 attached to axle 130. Journal 163 provides a downwardly elongated opening 165a receiving the shaft to result in a vertically elongated lost motion connection. Shafts 162 and 164 are and remain co-axial. It is seen that the two pivot means 160 and 161 transfer some loading from the frame to the axle while allowing axle pivoting due to raising and lowering of the wheels relative to the axles. Thus, the two pivot means 160 and 161 may be regarded as included in the suspension system. Also, axle 129 may tilt relative to axle 130 and vice versa, in accordance with wheel movement up and down on uneven road surfaces. Frame 116 may have different elevation relative to the axles, i.e. be lowered relative to the axles from the position shown.

The above described, very simple and effective suspension system, is especially suited to agricultural vehicles left in the open and exposed to the weather elements for long periods of time.

I claim:

1. In a vehicle suspension, the combination comprising:
   (a) a main frame extending forwardly,
   (b) front and rear pairs of wheels, and transverse axles for the wheels of said pairs,
   (c) two transversely spaced and forwardly and rearwardly elongated members pivotally carried by the frame to pivot about length axes defined by the members, each member having front and rear turned end portions,
   (d) four supports transmitting loading to the axles near the wheels, the supports terminally supporting said turned end portions, respectively, and the supports located in offset relation to said member length axes for transverse movement relative to said axles during pivoting of said members.

2. The combination of claim 1 wherein said front and rear turned end portions associated with each of the members extend laterally, in generally opposite directions.

3. The combination of claim 2 wherein one of said front and rear turned end portions extend toward a first wheel and the other of said turned end portions extends away from a second wheel, said first and second wheels being longitudinally spaced apart.

4. The combination of claim 1 including pivot means pivotally connecting said axles to the frame to allow pivoting of the axles relative to the frame about axes extending forwardly relative to the frame and located intermediate opposite sides of the frame.

5. The combination of claim 4 wherein said pivot means includes forward and rearward pivots proximate forward and rearward axles, respectively.

6. The combination of claim 5 wherein one of said forward and rearward pivots provides vertical lost motion connection between an associated axle and the frame.

7. The combination of claim 1 wherein the members are interconnected via the frame to allow pivoting of said members in the same sense, about their length axes, in response to elevation of any wheel relative to other wheels.

8. The combination of claim 1 including bearing means attached to side portions of the frame to pivotally carry each of said members at forward and rearward locations, releative to the frame.

9. The combination of claim 1 wherein said supports downwardly engage the axles to slide relatively transversely thereon in response to pivoting of said supports with said members.

10. The combination of claim 9 wherein each of said members is continuous between the turned end portions of that member.

11. The combination of claim 1 wherein each of said members is continuous between the turned end portions of the members.

12. In a vehicle suspension, the combination comprising:
(a) a main frame extending longitudinally forwardly and rearwardly,
(b) front and rear pairs of wheels, and transverse axles for the wheels of said pairs,
(c) two forwardly and rearwardly elongated transversely spaced members pivotally carried by the frame for pivoting of the members about length axes defined by the members, each member having front and rear turned end portions and being substantially continuous therebetween,
(d) four supports transmitting loading to the axles near the wheels, the supports terminally supporting said turned end portions, respectively, and the supports located in offset relation to said member length axes for transverse movement relative to said axles, during pivoting of said members.

13. The suspension of claim 12 including means pivotally connecting the axles to the frame to allow pivoting of the axles about forwardly extending axes, relative to the frame.

* * * * *